(12) United States Patent
Gake

(10) Patent No.: US 6,278,076 B1
(45) Date of Patent: Aug. 21, 2001

(54) WIRE CUT ELECTRIC DISCHARGE MACHINING APPARATUS AND CONTROL METHOD THEREFOR

(75) Inventor: Kiyoshi Gake, Fukui (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 09/355,911

(22) PCT Filed: Dec. 11, 1998

(86) PCT No.: PCT/JP98/05608

§ 371 Date: Aug. 9, 1999

§ 102(e) Date: Aug. 9, 1999

(87) PCT Pub. No.: WO99/29458

PCT Pub. Date: Jun. 17, 1999

(30) Foreign Application Priority Data

Dec. 11, 1997  (JP) .................................................... 9-341664

(51) Int. Cl.[7] .................................. B23H 7/04; B23H 7/20
(52) U.S. Cl. ...................................... 219/69.12; 219/69.13
(58) Field of Search ............................ 219/69.12, 69.13, 219/69.17; 700/162

(56) References Cited

U.S. PATENT DOCUMENTS

| | | | |
|---|---|---|---|
| 4,801,779 | * | 1/1989 | Obara ................................ 219/69.12 |
| 4,806,720 | * | 2/1989 | Obara ................................ 219/69.12 |
| 4,843,203 | * | 6/1989 | Gamo et al. ...................... 219/69.12 |
| 5,165,085 | | 11/1992 | Watanabe . |
| 5,824,985 | * | 10/1998 | Lodetti et al. ..................... 219/69.12 |

FOREIGN PATENT DOCUMENTS

| | | | |
|---|---|---|---|
| 340308 | * | 11/1989 | (EP) . |
| 62-213923 | | 9/1987 | (JP) . |
| 64-78723 | * | 3/1989 | (JP) .................................. 219/69.12 |
| 2-152748 | | 6/1990 | (JP) . |
| 2-279220 | * | 11/1990 | (JP) . |
| 8-318432 | | 12/1996 | (JP) . |

* cited by examiner

Primary Examiner—Geoffrey S. Evans
(74) Attorney, Agent, or Firm—McDermott, Will & Emery; Paul Devinsky

(57) ABSTRACT

A wire cut electric discharge machine which has a first wire guide movable relative to a workpiece in a first axial direction, and a second wire guide movable relative to a workpiece in a second axial direction which is parallel to the first axial direction, for machining the workpiece by generating an electrical discharge between a wire electrode traveling between the first and second wire guide, and the workpiece, where the sum of the degree of movement in the first axial direction and the degree of movement in the second axial direction is limited in order to prevent component parts of the device from striking one another.

4 Claims, 6 Drawing Sheets

F I G. 1
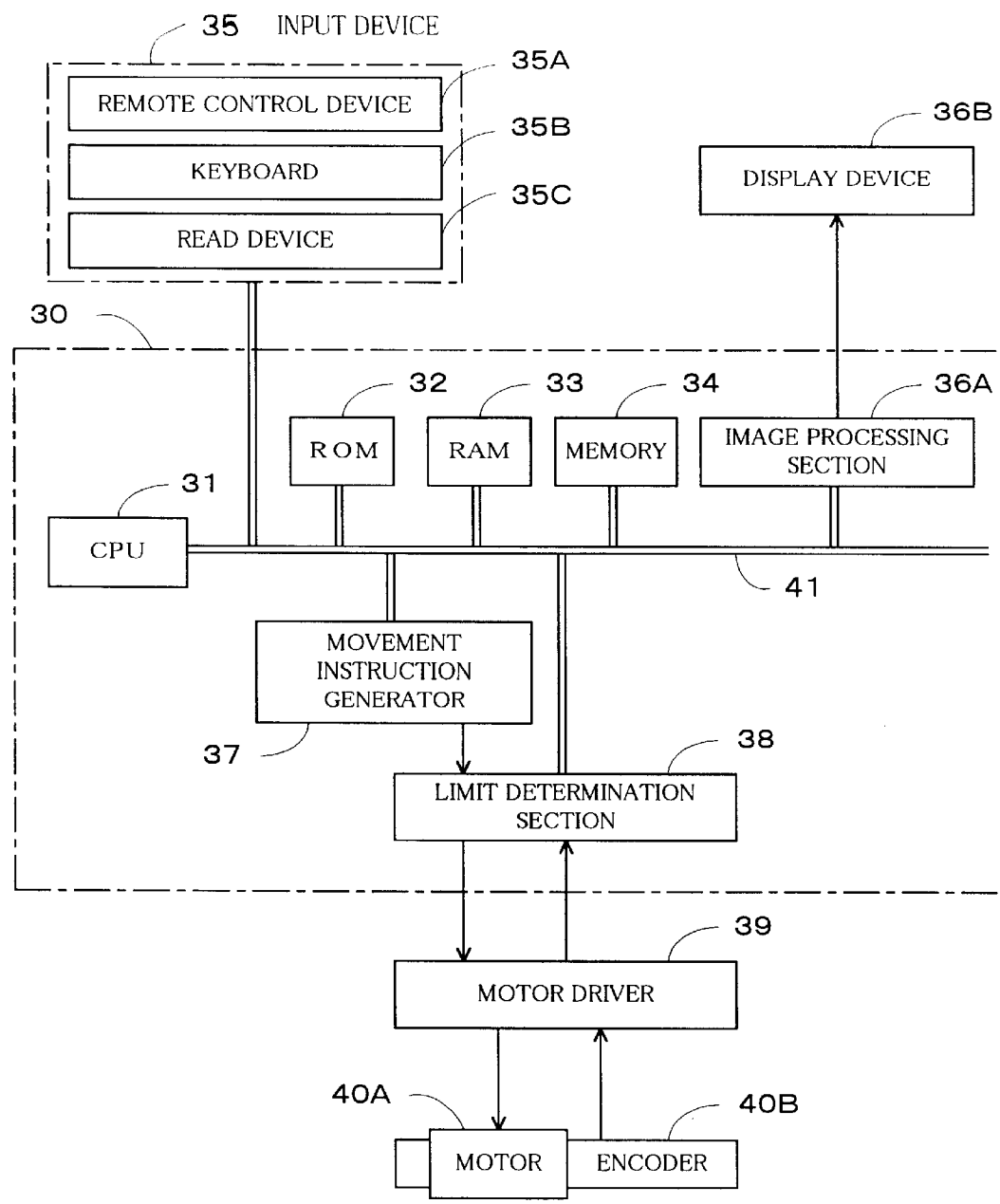

F I G. 6
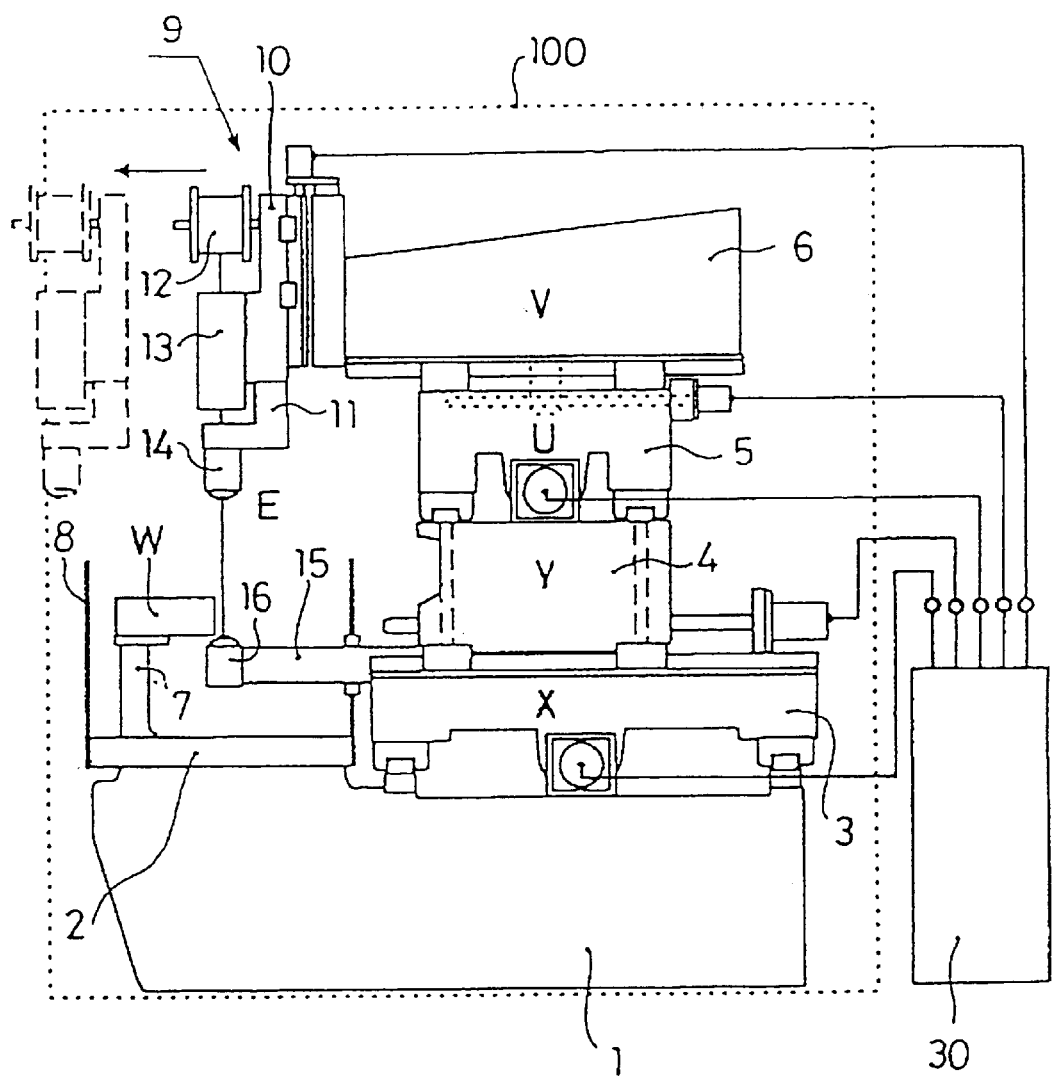

WIRE CUT ELECTRIC DISCHARGE MACHINING APPARATUS AND CONTROL METHOD THEREFOR

FIELD OF THE INVENTION

The present invention relates to a wire cut electric discharge machine which moves one of either a wire electrode or a workpiece with respect to the other in an X-Y plane. In particular, the present invention relates to a wire cut electric discharge machine capable of forming a taper cut surface in a workpiece by tilting a traveling wire electrode with respect to the X-Y plane.

BACKGROUND

In wire cut electric discharge machines, either the wire electrode or the workpiece is moved relative to the other within a horizontal plane ("the X-Y plane") determined by two perpendicular axes as the wire electrode travels between a pair of wire guides perpendicular to the X-Y plane. In many cases, the work piece is affixed to a work stand, and the work stand is attached to a table mounted on a bed movable within the X-Y plane.

Also known, as illustrated in FIG. 5, are wire cut electric discharge machines in which the table does not move, and each of the arms to which the wire guides are attached is supported by a part capable of moving within the X-Y plane. The wire cut electric discharge machine comprises a bed 1, a non-moving table 2 mounted on top of the bed 1, and a movable column 21. A work stand 7 is affixed to the table 2, and a workpiece W is attached to the work stand 7. A machining tank sidewall 8 which surrounds the workpiece W is also affixed the table 2.

A column 21 is mounted on the bed 1 so as to be movable in the X direction, and a ram 22 is mounted on top of the column 21 so as to be movable along the Y axis, which is perpendicular to the X axis. A head 9 is provided on the portion of ram 22 which protrudes toward the machining tank side, such that it can move in the Z axis which is perpendicular to the X-Y plane.

A wire supply device comprising a device to impart tension to a wire electrode E and multiple pulleys is provided on the machining head 9. A taper cut unit 23, formed of sliders 231 and 232, is provided on the bottom edge of the machining head 9. The slider 231 is movable in the U axis direction which is parallel to the X axis, and the slider 232 is movable in the V axis direction which is parallel to the Y axis. An automatic wire threader 13—the "AWT"—which automatically pushes the wire electrode E through a hole in the workpiece W, is attached to the taper cut unit 23. In the illustrated example, upper arm 11 is also attached on one edge to the taper cut unit 23, and an upper wire guide device 14 is attached to the other end of the upper arm 11. An approximately L-shaped lower arm 15 is affixed at one end to the bottom of the ram 22, and extends downward in the column 21 through a hole in the ceiling of the column 21. The lower arm 15 next penetrates the sidewall 8 of the horizontally extending machining tank, and a lower wire guide device 16 is attached to the other end of the lower arm 15.

During machining, the wire electrode E normally moves in the X-Y plane relative to the workpiece W, and travels between the pair of wire guide devices 14 and 16 perpendicular to the X-Y plane. For example, when fabricating a die with a tapered surface, machining is usually done by tilting the wire electrode E which travels between the pair of wire guide devices 14 and 16 by some angle away from the Z axis. With "taper cuts" of this type, the upper wire guide device 14 moves in the U-V plane which is determined by the orthogonal U and V axes, by means of the taper cut unit 23. The size of the taper cut unit 23 is limited by the machine's rigidity, such that the maximum movement of the upper wire guide device 14 is normally about 70 mm in both the U and V axes.

In recent years there has been a need for wire cut electric discharge machines having a large degree of movement in the U and V axes in order to form a sloped surface with a substantial angle on a workpiece of some thickness. A wire cut electric discharge machine with such features but without a loss of machine rigidity is illustrated in FIG. 6. The same reference numerals (as used in FIG. 5) are used to designate the same elements as in the wire cut electric discharge machine of FIG. 6, so an explanation thereof is omitted. A mechanical cover 100, which blocks electromagnetic radiation above a certain frequency in accordance with the law, covers the wire cut machine.

The mechanical cover 100, which blocks electromagnetic radiation above a certain frequency is accordance with EMC (electromagnetic compatibility) regulations, covers the wire cut electric discharge machine. A moving body 3 is mounted on a bed 1 so as to be movable along the X axis, and a moving body 4 is mounted on a column 21 so as to be moveable along the Y axis which is perpendicular to the X axis. The lower arm 15 is supported at one end by a moving body 4. A moving body 5 is mounted on the moving body 4 so as to be movable along the U axis which is parallel to the X axis, and a moving body 6 is mounted on the moving body 5 so as to be movable along the V axis which is parallel to the Y axis. A panel 10 is provided on the portion of the moving body 6 which protrudes toward the machining tank side, so as to be movable along the Z axis which is perpendicular to the X-Y plane. A wire supply device comprising a wire bobbin 12 around which is wound the wire electrode E, a device for imparting tension the wire electrode E, and multiple pulleys, is provided on the panel 10. Furthermore, the automatic wire threader 13 and the upper arm 11 are attached to the panel 10. A numerical control device 30 comprising a computer controls movement in the X axis, the Y axis, the U axis, the V axis, and the Z axis directions.

As is clear from the diagrams, the wire cut electric discharge machine in FIG. 6 provides a maximum movement for the moving body 5 and the moving body 6 which is greater than that of sliders 231 and 232 in FIG. 5. In recent wire cut electric discharge machines, a greater maximum movement is sought with respect to the U and V axes, as is a smaller installation footprint. Therefore when the panel 10 and the machining tank side wall 8 are designed for minimum size, there is a danger that these parts may be physically struck by other mechanical components. It is necessary, for example, to prevent the head 9 from striking other mechanical components such as the machining tank side wall 8 or the mechanical cover 100, or excessive overhang of the head 9.

SUMMARY OF THE INVENTION

An object of the present invention is to provide a wire cut electric discharge machine which assures a greater maximum movement with respect to the U and V axes, wile at the same time reliably preventing physical striking by movable mechanical components of other mechanical components.

Other objects of the present invention will be described below, and will be apparent to practitioners of the art.

In order to accomplish the above and other objects, a wire cut electric discharge machine according to the present invention has a first wire guide movable relative to a workpiece in a first axial direction, and a second wire guide movable relative to a workpiece in a second axial direction which is parallel to the first axial direction, for machining the workpiece by generating an electrical discharge between a wire electrode traveling between the first and second wire guide and, the workpiece. where the sum of the degree of movement in the first axial direction and the degree of movement in the second axial direction is limited.

In order to accomplish the above and other objects, a wire cut electric discharge machine according to the present invention has a first wire guide movable relative to a workpiece in a first axial direction, and a second wire guide movable relative to a workpiece in a second axial direction which is parallel to the first axial direction, for machining the workpiece by generating an electrical discharge between a wire electrode traveling between the first and second wire guide and, the workpiece, where the sum of the quantity of movements in the first axial direction and the second axial direction is limited.

instructing movement in at least one of the first and second axial directions; detecting the quantity of movement of the first axis and the quantity of movement of the second axis;

comparing the sum of the two detected quantities of movement with a limit; and stopping movement in at least one of the axes when said sum exceeds the limit.

BRIEF DESCRIPTION OF DRAWINGS

FIG. 1. is a block diagram illustrating an embodiment of a wire cut electric discharge machine according to the present invention.

FIG. 6 is a side view illustrating another conventional wire cut electric discharge machine.

DETAILED DESCRIPTION OF THE PRESENTLY PREFERRED EMBODIMENTS

Figure 2:
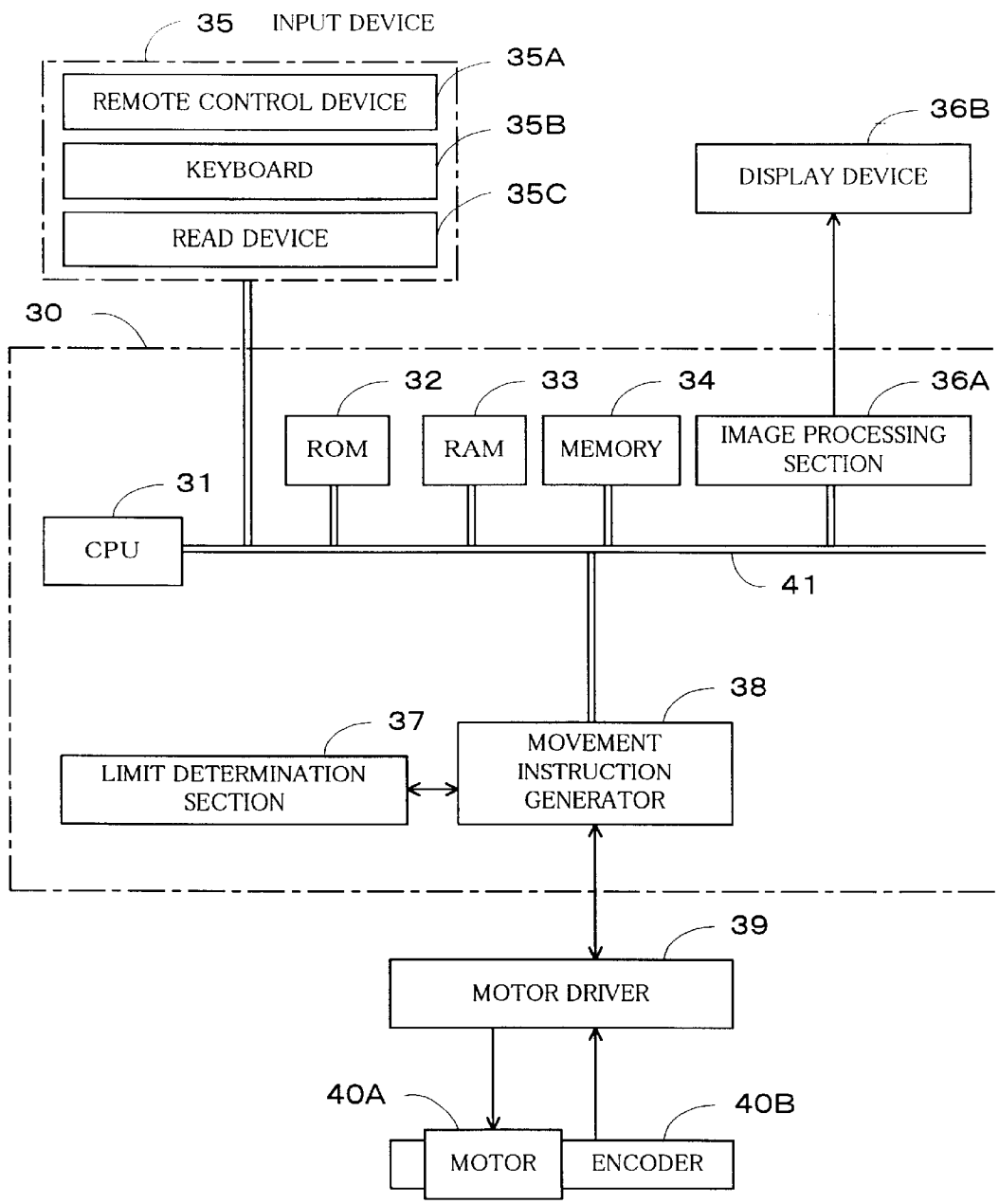
FIG. 2 is a block diagram illustrating another embodiment of a wire cut electric discharge machine according to the present invention.

An embodiment of the wire cut electric discharge machine of the present invention is explained with reference to FIG. 1. The wire cut electric discharge machine of the present invention may be characterized by its control device, and may comprise mechanical portions similar to these various conventional types of wire cut electric discharge machines.

The numerical control device 30 comprises a CPU 31, a ROM 32, a RAM 33, and a memory 34 comprising registers. The ROM 32 stores a system program; the CPU controls the entire electric discharge machine in accordance with the system program; the RAM 33 temporarily stores the NC program and the movement of each mechanical component in each axial direction, and the memory 34 which may, for example, comprise non-volatile memory, stores limits and the program which checks whether an instructed quantity of movement is within those limits. In the illustrated embodiment, an input device 35 may comprise a remote control device 35A, a keyboard 35B, and a read device 35C capable of reading out data from a storage medium such as tape or disk. The numerical control device 30 may further comprise an image processing section 36A which supplies an output signal to a display device 36B such as a CRT, a movement instruction generator 37, which supplies movement instructions to the respective motor drivers which drive the motors, and a limit determination section 38 which receives the movement instruction and determines whether the quantity of movement instructed is within the limit. The movement instruction generator 37 reads the NC program block by block and obtains the machining path to supply movement instructions required for that machining path through the limit determination section 38 to an appropriate motor driver 39. In the illustrated embodiment, only one combination of a motor 40A and a motor driver 39 is shown; other combinations are omitted. A encoder 40B attached to the motor 40A sends a signal indicating the present movement to the limit determination section 38 through the motor driver 39. The input device 35, ROM 32, RAM 33, memory 34, image processing section 36A, movement instruction generator 37, and limit determination section 38 are connected to the CPU 31 through an address-data bus line 41.

When the movement instruction generator 37 receives a manual data input ("MDI") signal or an NC program under control of the CPU 31, it supplies a movement instruction to the limit determination section 38. When the limit determination section 38 determines that the instructed quantity of movement exceeds the limits, it does not supply that movement instruction to the motor driver 39, and requests error processing from the CPU 31.

Figure 3:
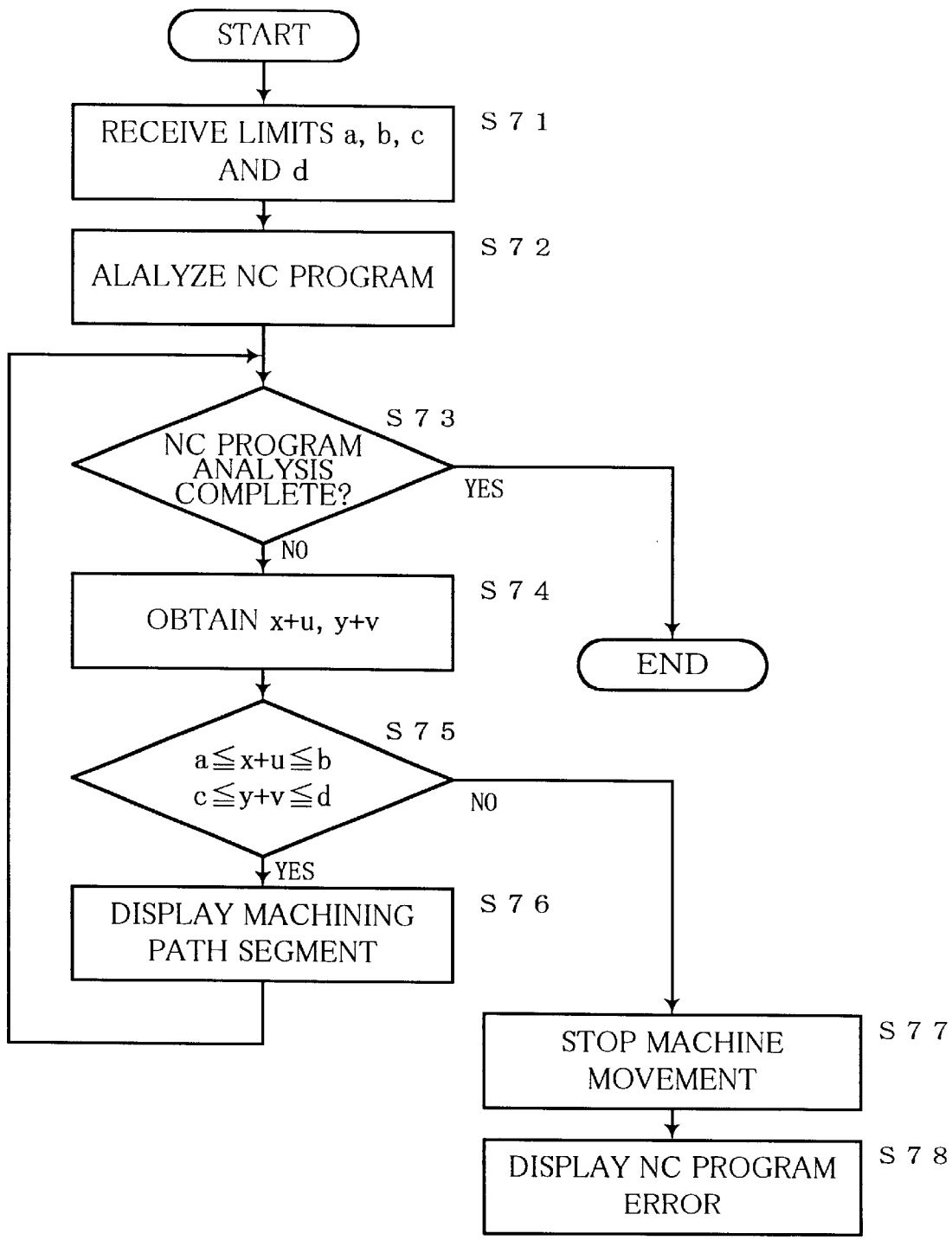
FIG. 3 is a flow chart indicating the operation of the numerical control device in FIG. 1.
Figure 4:
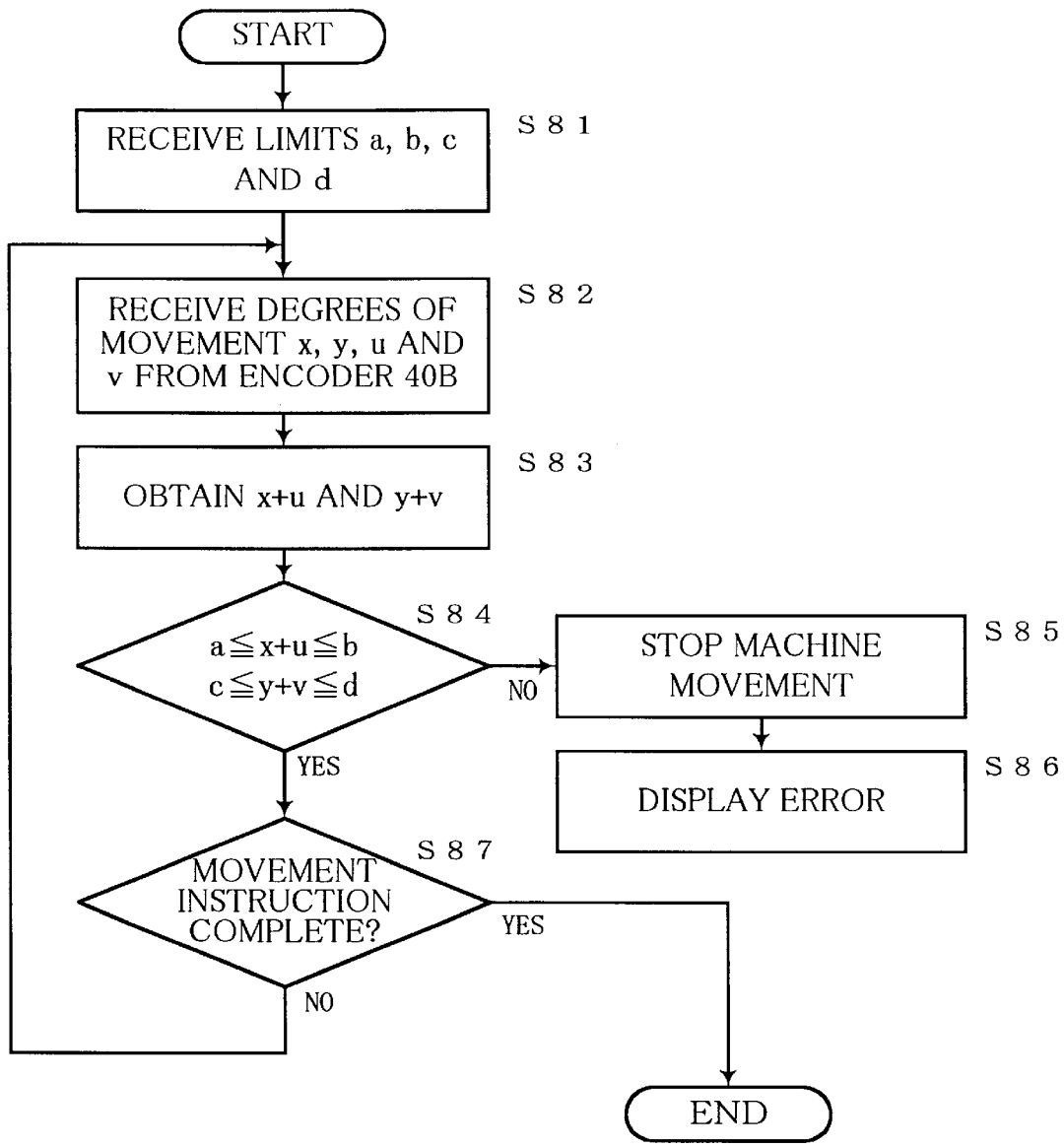
FIG. 4 is a flow chart indicating the operation of the numerical control device in FIG. 1.
Figure 5:
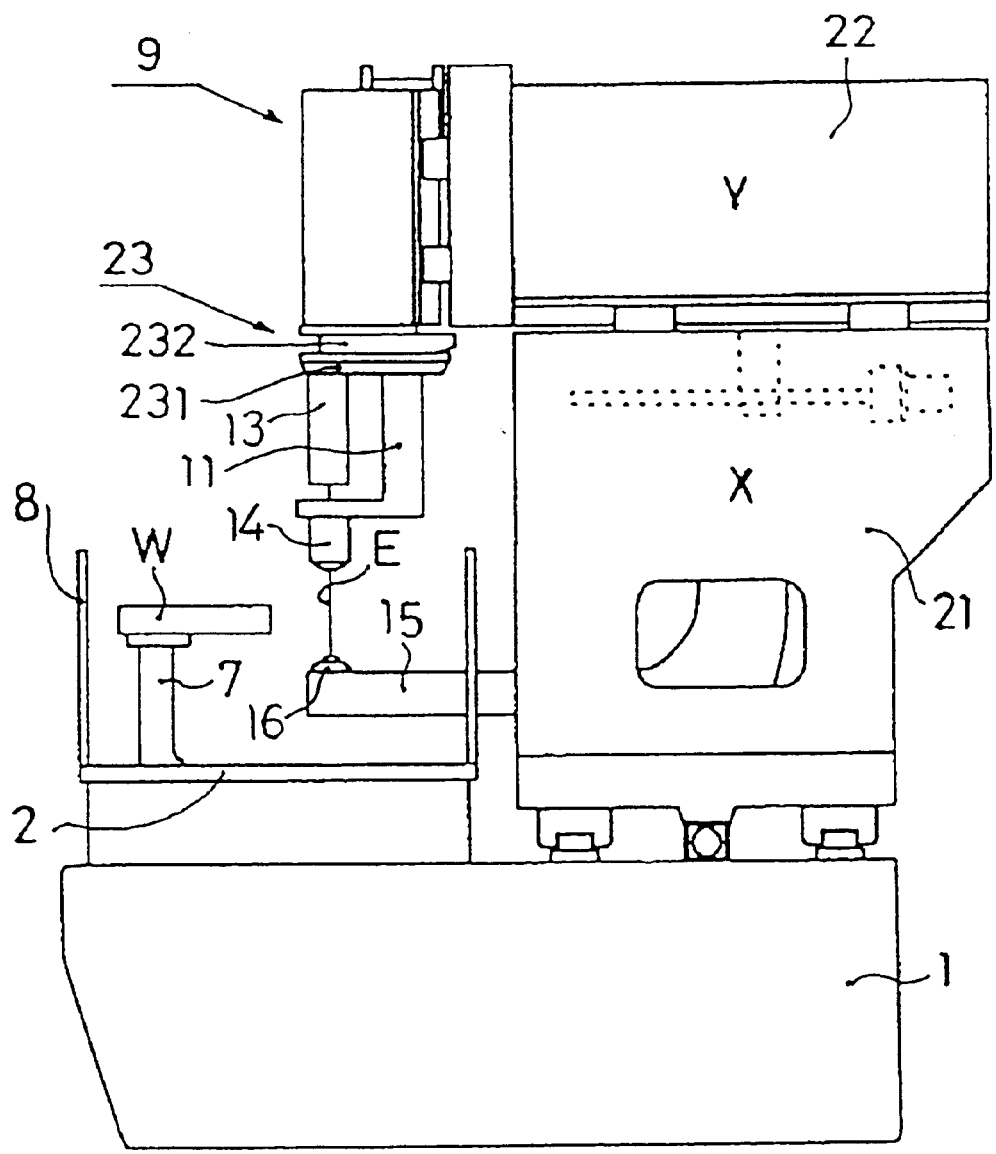
FIG. 5 is a side view illustrating a conventional wire cut electric discharge machine.

The flow chart in FIG. 3 shows the process by which the numerical control device 30 checks whether the NC program contains movements which exceed the limits. The program which performs the limit check is stored in the memory 34. During a limit check, the table or pair of wire guides to which the workpiece is attached move in accordance with the NC program, but, preferably, the workpiece is not machined.

When the limit is set from, for example, the keyboard 35B, the limit set is stored in the memory 34 at step S71. In the described embodiment, a lower limit a and an upper limit b for the sum of the X axis quantities of movement, (x) and the U axis quantity of movement, (u), and a lower limit c and upper limit d for the sum of the Y axis quantity of movement (y) and V axis quantity of movement (v) are set. The U axis direction is parallel to the X axis direction, and the V axis direction is parallel to the Y axis direction. The movement instruction generator 37 reads the NC program temporarily stored in the RAM 33 for each block at step S72, generating a movement instruction. This movement instruction is provided to the limit determination section 38 while also being stored in the RAM 33. The process is completed when the movement instruction generator 37 has read all program blocks of the NC program at step S73. Otherwise the process proceeds to step S74, and the limit determination section 38, in accordance with the program stored in the memory 34, finds the sum of the instructed quantities of movement in a certain axis and the current movement in another axis parallel to the certain axis. For example, when the received movement instruction indicates a quantity of movement in the U axis direction, the limit determination section 38 finds the sum x+u of the instructed movement u and the X axis direction current movement x. Continuing to step S75, the limit determination section 38 determines whether the sum x+u is within the limits a and b. When it is determined at step S75B that the instructed movement is within the limit, the machining path is displayed on the display 36B at step S76, and the process returns to step 73. Otherwise, machine movement stops at step S77, and a message indicating an NC program error is generated at step S78 and displayed on the display 36B.

The set limit is first stored in the memory 34 at step S81. The limit determination section 38 reads the current quantity of movement in the x, y, u and v directions for the X, Y, U, an V axes from the encoder 40B at step S82, and finds the movement sums x+u and y+v at step S83. If it is determined at step S84 that the sum x+u is not between the limits a and b or the sum y+v is not between the limits c and d, machine movement is halted at step S85 and a message indicating "limit exceeded" appears on the display device 36B at step S86. Otherwise, the process proceeds to step S87. When the movement instruction is valid, the process returns to step S82.

The present invention is not intended to be limited to the disclosed form. It is clear that many improvements and variations are possible with reference to the above description. For example, as illustrated in FIG. 2, the limit determination section 38 may be connected only to the movement instruction generator 37. In that case, when the limit determination section 38 receives a movement instruction from the movement instruction generator 37, it supplies a signal indicating the determination result to the CPU 31 through the movement instruction generator 37.

The illustrated embodiment was selected to explain the essence and practical application of the invention. The scope of the invention is defined by the attached claims.

What is claimed is:

1. A wire cut electric discharge machine for machining a workpiece by generating an electrical discharge between a wire electrode traveling between the pair of wire guides and the workpiece, said electric discharge machine having a pair of wire guides movable relative to the workpiece between a zero movement quantity and a maximum movement quantity along a first axis, one of the pair of wire guides being movable relative to the other between a zero movement quantity and a maximum movement quantity along a second axis parallel to the first axis, the wire cut electric discharge machine further comprising:

a control device for limiting the sum of a movement quantities along the first and second axes.

2. The wire cut electric discharge machine according to claim 1, wherein the control device comprises:

a memory for storing the present movement quantities along the first and second axes and minimum and maximum values of movement along the first and second axes; and means responsive to a movement along one of the first and second axis for determining if the sum of an instructed quantity of movement along one of first and second axes and the quantity of present movement along the other axis of first and second axes is within the minimum and maximum values.

3. A method of controlling a wire cut electric discharge machine having a pair of wire guides movable relative to a workpiece along orthogonal X and Y axes between a zero movement quantity and a maximum movement quantity, one of the pair of wire guides being movable relative to the other along orthogonal U and V axes which are parallel to the X axis and Y axis respectively, the method comprising:

storing present movement quantities of the wire guides along the X, Y, U and V axes and minimum and maximum values of movement;

instructing movement of the wire guides along at least one of the X and Y axes;

determining the sum of the instructed movement quantity along at least one of X and Y axes and the present movement quantity along the corresponding one of the U and V axes;

determining if said sum is within the minimum and maximum values of movement; and stopping the instructed movement when said sum exceeds the minimum and maximum values.

4. A method of controlling a wire cut electric discharge machine having a pair of wire guides movable relative to a workpiece along orthogonal X and Y axes between a zero movement quantity and a maximum movement quantity, one of the pair of wire guides being movable relative to the other along orthogonal U and V axes which are parallel to the X axis and Y axis respectively, said method comprising:

storing present movement quantities of the wire guides along the X, Y, U and V axes and minimum and maximum values of movement;

instructing movement from a present movement quantity along at least one of the U and V axes;

determining the sum of the instructed movement quantity along at least one of U and V axes and the present movement quantity along the corresponding one of the X and Y axes;

determining if said sum is within the minimum and maximum values of movement; and stopping the instructed movement when said sum exceeds the minimum and maximum values.

* * * * *